Oct. 13, 1959 H. T. FAUS 2,908,867
ELECTRIC MEASURING INSTRUMENT
Filed Oct. 17, 1957

Inventor:
Harold T. Faus
by Richard E. Horley
His Attorney

United States Patent Office 2,908,867
Patented Oct. 13, 1959

2,908,867

ELECTRIC MEASURING INSTRUMENT

Harold T. Faus, Lynn, Mass., assignor to General Electric Company, a corporation of New York Application October 17, 1957, Serial No. 690,738

3 Claims. (Cl. 324—147)

My invention relates to current responsive devices and more particularly to electric measuring instruments of the so-called moving iron type.

Electric measuring instruments of the moving iron type generally comprise a current conducting coil winding inductively related to a pair of relatively movable magnetic vanes otherwise known as irons. Basically, moving iron instruments operate on the repulsion principle according to which the relatively movable magnetic vanes experience a repelling force due to their proximity and magnetization to like polarities. Another form of the moving iron instrument operates on a repulsion-attraction principle according to which a magnetic member additional to those having like polarities is magnetically induced to have a polarity opposite to that of the movable magnetic vane. The arrangement of the magnetic members is such that deflection of the movable vane is obtained via forces which are both repelling and attracting operating over part of the total range of deflection in complementary manner. If a suitable control device such as a spiral control spring is provided the position of the movable vane serves as a measure of current since the degree of magnetization and hence the strength of repulsion and repulsion-attraction varies with the magnitude of the current flowing through the winding.

Scale length and relative distribution have customarily been controlled by shaping and location of vanes and irons. In addition, to control scale length it has been customary to make certain of the magnetic members adjustable. Adjustability of presently known structures, however, has involved modification of scale distribution as a concomitant of full scale adjustment. To achieve a satisfactory high accuracy in a predetermined calibration under such conditions is at best a difficult proposition.

It is an object of my invention to provide an electrical instrument of the moving iron type in which a higher accuracy in scale adjustment can be achieved.

It is still another object of my invention to provide such an instrument in which full scale adjustment may be made without changing the relative distribution of the scale.

It is also an object of my invention to provide an instrument of the repulsion or repulsion-attraction type in which the scale distribution in any desired portion of the scale may be adjusted independently of the full scale adjustment.

Briefly stated in accordance with one aspect of my invention I provide an iron vane type electric instrument in which an external magnetic circuit is formed to surround the coil of the instrument and which has an air gap or other high reluctance between the magnetic members forming the external magnetic circuit. I acquire full scale adjustment to a linear degree throughout the entire scale length of the instrument by means of an adjustable magnetic member in the external magnetic circuit adapted to reduce the size of the air gap therein or otherwise adapted to decrease the reluctance of the external magnetic circuit. In a preferred embodiment of my invention, I provide for partial shielding of the coil and internal magnetic members of an iron vane instrument and arrange the shield members so as to form an air gap therebetween. In this embodiment, the adjustment of the full scale position without modifying the scale distribution is effectuated by a magnetic band member telescopically positioned on one or more of the shielding members and slidable thereon in a direction which permits modifying the magnitude of the air gap between the shield members. It will be appreciated that the provision of an adjustable member in an external magnetic circuit provides significant advantages which simplify full scale adjustment making. It will further be seen that the magnetic circuit adjustment external to the instrument structure permits the independent adjustment of scale distribution and full scale adjustment. It will also be seen that the adjustment of the external magnetic circuit to modify the reluctance thereof accomplishes a full scale adjustment without disturbing the relative position of intermediate settings of calibration which make up the scale distribution.

The features of this invention which are believed to be patentable are set forth with particularity in the appended claims, while further advantages, objects, and a clearer understanding of the invention may be readily had by reference to the following description in which Figure 1 is a front elevation of a half section of an electric measuring instrument incorporating elements adapted to operate on the attraction repulsion principle;

Like reference characters are utilized throughout the drawings to designate like parts.

Figure 3:
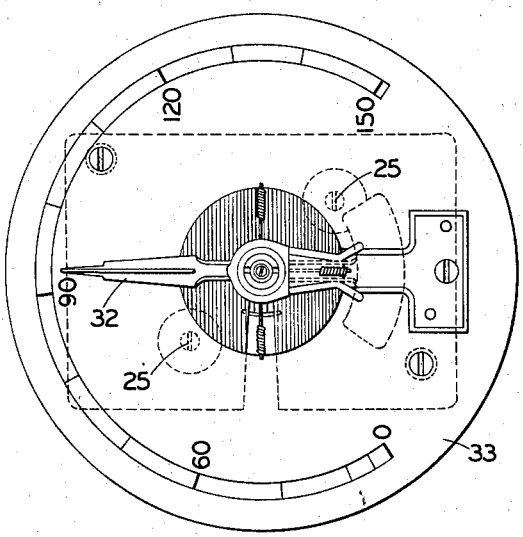
Figure 3 is a top view of the instrument shown in Figure 1.

Referring to the drawings, the features of my invention are disclosed in relation to a moving iron instrument operating on the repulsion-attraction principle and preferably of the type disclosed in Patent 2,183,566 of Hoare.

Figure 2:
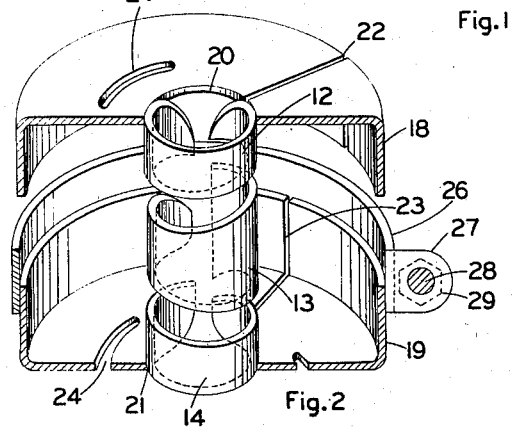
Figure 2 is a partial showing of an electric instrument of the iron vane type showing in perspective the stationary elements of the magnetic circuit both internal and external with the coil and moving elements as well as indicating components removed for purposes of clarifying and disclosing the particular characteristics of this invention.
Figure 5:
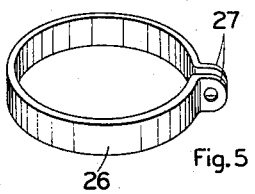
Figure 5 is a perspective view of a magnetic member used for full scale adjustments.

As illustrated in Figure 2 the apparatus incorporating the features of my invention comprises basically a current conducting winding or coil 11 surrounding stationary magnetizable elements or irons 12, 13, and 14 and a pivotally mounted revoluble vane or movable iron 15. The movable vane 15 is so related to stationary irons 12, 13, and 14 that an axial magnetic field produced by an electric current flowing through the winding induces magnetic poles in the stationary and movable irons and the mutual forces of repulsion and attraction bring movement of the vane 15 in an upscale direction. As set out with greater particularity in Patent 2,183,566—Hoare issued December 19, 1939, and assigned to the same assignee as the present application, it will be noted that the desired scale distribution in the particular instrument disclosed in the drawings is obtained by shaping and placing of the stationary irons 12, 13, and 14. It is to be understood however that the particular electric measuring instrument disclosed is merely illustrative and that other shapes and types of magnetic vanes may be utilized within the purview and scope of my invention for the full purposes thereof.

The coil 11 may be wound upon a spool formed by a pair of end pieces 16 surrounding a hollow cylinder or winding form 17, the parts 16 and 17 are preferably non-magnetic and may be composed of suitable insulating material. If desired the parts 16 and 17 may be molded in a single piece from plastic material and furthermore one or more of the stationary irons 12, 13, and 14 may also be molded into the winding form 17. Of course, where adjustability may be desired at least one of the stationary mounting irons will be mounted angularly or longitudinally movable within the winding form 17.

The magnetizable members 12, 13, 14, and 15 may be composed of any suitable magnetizable material such as silicon steel or soft iron but may preferably be of a relatively high permeability material such as an alloy of 46 to 48 percent nickel and the remainder iron or an alloy such as described in Patent 1,586,884—Elmen having approximately 78½ percent nickel and the remainder iron.

In order to increase somewhat the available torque and in order to provide partial shielding against the effect of external fields, it is customary to provide this type instrument with cup-shaped members 18 and 19 which are composed of any suitable magnetizable material such as one of those discussed in connection with the discussion on stationary and movable irons 12, 13, 14, and 15. Cup-shaped members 18 and 19 have circular openings 20 and 21 in the base portion thereof which may be approximately the same in diameter as the inner surface of the winding form 17 so that the outer edges of the auxiliary irons 12 and 14 meet the edges of the openings 20 and 21 in the cup-shaped members 18 and 19, respectively. Preferably, the cup-shaped members 18 and 19 are slit radially at 22 and 23 and the portions opposite the gaps between the ends of the auxiliary irons 12 and 14 in order to avoid interference with distribution of magnetization of the auxiliary irons. If desired, the auxiliary irons may be secured to the cup-shaped members 18 and 19 in any suitable manner, e.g., by tack welding. An angular adjustment of the auxiliary irons may be obtained by rotating the cup-shaped members 18 and 19. For this purpose the cup-shaped members 18 and 19 or at least one of them may be provided with arcuate slots 24 cooperating with suitable rivets or screws 25 fastened in the same portion of the stationary part of the apparatus such as the spool ends 16.

Cup-shaped members 18 and 19 when mounted on spool 16 form an external magnetic return path for flux generated by current in winding 11. In accordance with my invention the cup-shaped members 18 and 19 are mounted so as to have their respective ends in substantial alignment and are spaced from each other thus forming a high reluctance in the external magnetic circuit return path. For varying the relutcance of this external magnetic circuit return path and the magnetic circuit for the instrument as a whole, I provide magnetic band member 26 which in one form encircles shield member 19 and is mounted telescopically thereon to be slidable axially to overlap the end of cup-shaped member 19 thereby reducing the separation between cup-shaped members 18 and 19. The ends of magnetic band member 26 are formed to have tabs 27 to which is attached an adjustable slack take-up and tightening means such as bolt 28 and nut 29.

A shaft 30 is provided for carrying the movable irons 15 in the arrangement illustrated. In order to provide a uniform air gap the shaft is mounted substantially coaxially with the winding form 17 with the vane 15 offset sufficiently from the shaft 30 so that vane 15 will be carried along close to the inner surface of stationary arms 12, 13, and 14 which in turn line the substantially circular cylindrical inner surface of the winding form 17. The construction shown provides a good scale distribution, and it will be understood that this invention is not limited to this precise distribution and to having the shaft concentric with the stationary arms and having the latter of constant radius. The shaft 30 is mounted in suitable bearing secured to a stationary portion of the apparatus and biasing spring 31 is provided for obtaining a control torque. For indicating measurements a pointer 32 is provided carried by shaft 30 and the scale 33 having graduations cooperating with the pointer 32.

As already indicated the instrument operates by magnetic repulsion and attraction between stationary and movable vanes. More specific details on the nature of this operation is understood by referring to the aforementioned patent to Hoare. It will be understood that for the zero position of the instrument the movable vane 15 will be near the left end of the repulsion iron 13 in Figure 2. As the pointer moves upscale, vane 15 moves in a clockwise direction looking at the arrangement of Figure 3.

By suitable dimensioning and shaping of the parts, it is possible to obtain variations in the scale distribution. The construction also is designed to obtain the desired modifications of the scale distribution even in the case of instruments which have been finally constructed. For expanding the lower end of the scale one or both of the cup-shaped members may be rotated in opposite directions. When the desired adjustment is obtained the cup-shaped members are secured in their angular position by tightening screws 25. The scale distribution of the instrument may also be changed by an actual change in the design of the instrument, for example, by changing in the slope or in some other manner changing the shape for the stationary or movable irons or by changing their positions.

Figure 4:
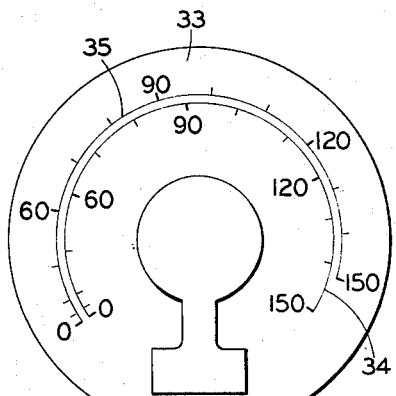
Figure 4 is a plan view of the scale plate illustrating a typical long scale calibration in which the full scale adjustment feature of my invention is useful.
Figure 1:
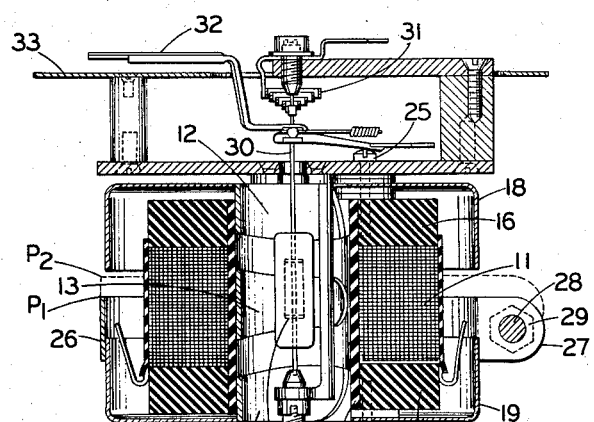

To illustrate the operation of the full scale adjustment assume that the upper edge of the full scale adjusting band 26 is in the position $P_1$ (Figure 1) and the calibration is that shown by the group scale points radiating from arcuate line 35 of Figure 4. If the band 26 is moved toward shield member 18 until the full scale position of the pointer corresponds to the full scale calibration radiating inwardly from arcuate line 34 of Figure 4, band 26 will then occupy a position corresponding to dotted line $P_2$ and all other inwardly radiating scale points except zero will move up a percentage equal to the percentage of expansion of full scale. The adjusted calibration will then have been effected without disturbing the scale distribution but will have provided for full scale control.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. An electric measuring instrument of the moving iron type comprising in combination a winding having a centrally disposed opening therein, said winding being effective when energized for producing a magnetic field in said opening, relatively movable magnetic vanes within said opening responsive to the magnetic field in said opening, said vanes being relatively deflectable through rotation of one vane in accordance with a predetermined flux distribution within said magnetic field, and external magnetic members surrounding and substantially enclosing said winding and forming a magnetic circuit with said magnetic vanes, said external magnetic members being arranged to form an air gap therebetween in said circuit, said external magnetic members being adjustable in a direction parallel to the axis of rotation of said one vane independently of said vanes to vary the length of said air gap and adjust the strength of the field without substantially affecting the flux distribution thereof.

2. An electric measuring instrument of the moving iron type comprising in combination a winding having a centrally disposed opening therein, said winding being effective when energized for producing a magnetic field in said opening, relatively movable magnetic vanes within said opening responsive to the magnetic field in said opening, said vanes being relatively deflectable in accordance with a predetermined flux distribution within said magnetic field, first and second external magnetic members surrounding and substantially enclosing said winding and forming a magnetic circuit with said magnetic vanes, said external magnetic members being arranged to form a high reluctance opening in said circuit, said high reluctance opening surrounding said coil, and a third magnetic member surrounding said winding, said third magnetic member being axially adjustable for varying the reluctance of said high reluctance opening and adjusting the strength of the field without substantially affecting the flux distribution thereof.

3. An electric measuring instrument of the moving iron type comprising in combination a cylindrical winding having an axial opening therein, said winding being effective when energized for producing a magnetic field in said opening, relatively movable magnetic vanes within said opening responsive to the magnetic field in said opening, said vanes being relatively deflectable in accordance with a predetermined flux distribution within said magnetic field, a pair of cup-shaped magnetic shield members forming a magnetic circuit with said vanes and arranged to substantially enclose and shield said winding, said shield members having their ends separated to form an axial air gap therebetween, and a cylindrical magnetic band member telescopically mounted on one of said shield members for slidable axial adjustment thereon for varying the length of said air gap and adjusting the strength of the field without substantially affecting the flux distribution thereof.

References Cited in the file of this patent

UNITED STATES PATENTS

| | | |
|---|---|---|
| 2,183,566 | Hoare | Dec. 19, 1939 |
| 2,373,998 | Burgwin | Apr. 17, 1945 |
| 2,628,993 | Hall | Feb. 17, 1953 |
| 2,795,679 | Lowry | June 11, 1957 |